Figure 1:
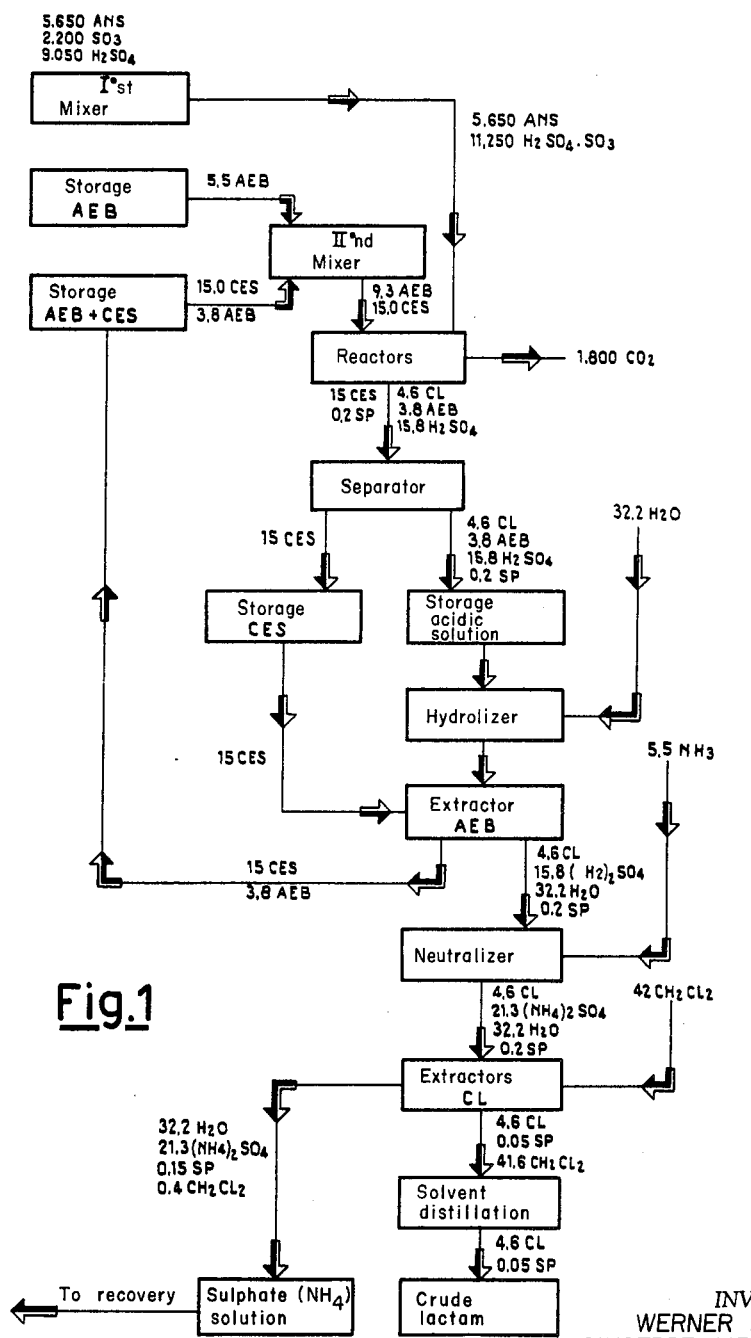

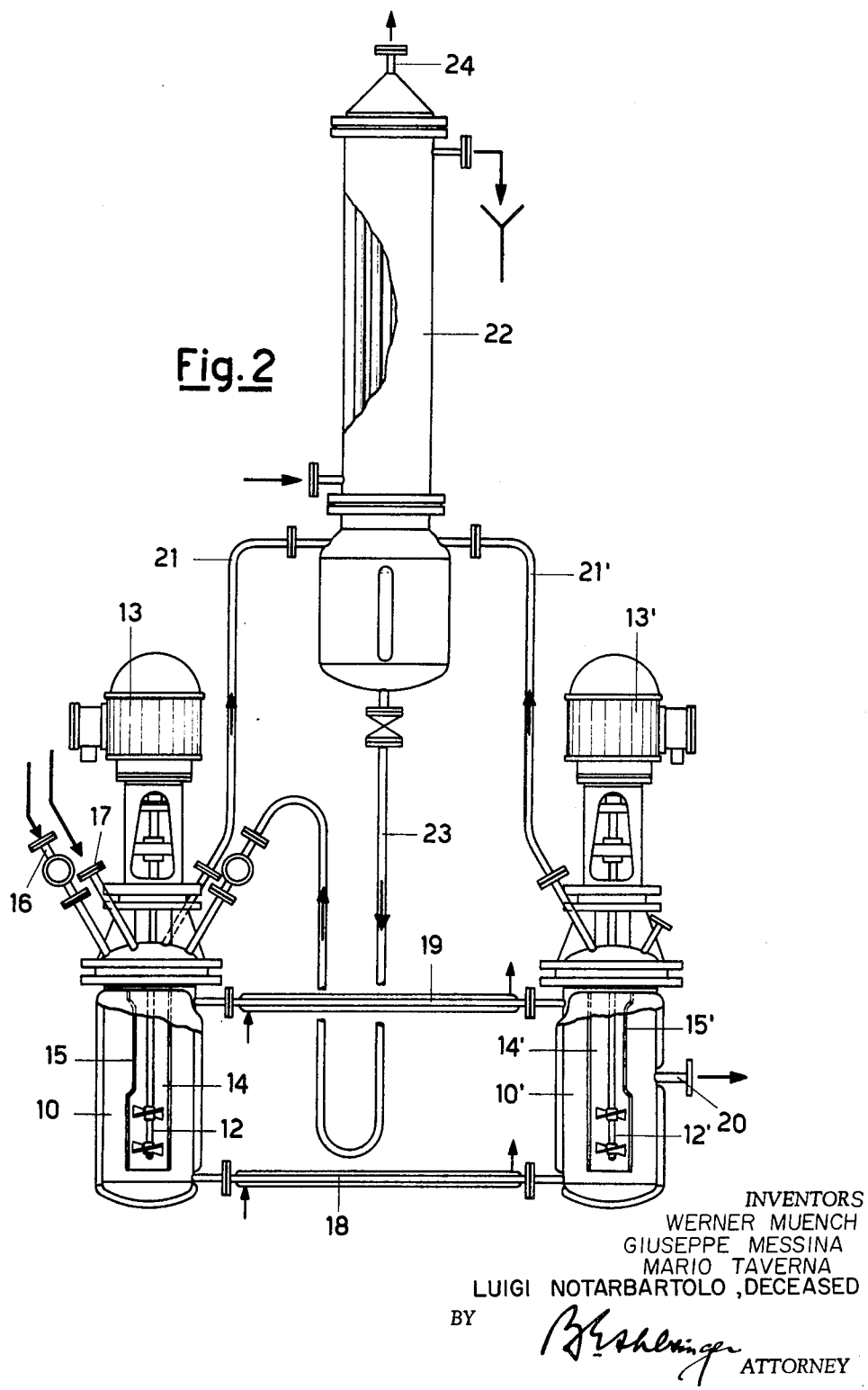

United States Patent Office 3,200,112
Patented Aug. 10, 1965

3,200,112
PROCESS FOR THE PREPARATION OF CAPROLACTAM
Werner Muench, Cesano Maderno, Giuseppe Messina, Limbiate, and Mario Taverna, Milan, Italy, and Luigi Notarbartolo, deceased, late of Milan, Italy, by Enza Pascalino, administratrix, Milan, Italy, and Paola Notarbartolo, heiress, Milan, Italy, assignors to Snia Viscosa Societa Nazionale Industria Applicazioni, Milan, Italy, a company of Italy
Filed Nov. 5, 1962, Ser. No. 235,572
Claims priority, application Italy, Nov. 9, 1961, 20,186/61, Patent 661,532
18 Claims. (Cl. 260—239.3)

In Patent No. 3,022,291 previously granted to the applicants, a general process was described for the preparation of caprolactam by nitrosation of cyclohexyl compounds having a tertiary carbon atom such as, for instance, hexahydrobenzoic acid and its functional derivatives, cyclohexyl aryl ketones, dicyclohexyl ketone and others. The object of the present invention is to provide improvements in the process described in the aforementioned patent. In particular, the object is to provide a continuous process by which it is possible to obtain caprolactam of high strength and in high yields. In the following specification, the considered starting material will be, for example, hexahydrobenzoic acid.

According to the present invention, nitrosation of hexahydrobenzoic acid, or of another starting material which is very exothermic, is carried out continuously in the presence of an amount of cyclohexane such that, as a result of its vaporization, preferably under reflux conditions, temperature control within a very narrow range can be achieved. Subsequently, cyclohexane is separated by decantation. The remaining acid caprolactam solution is hydrolyzed. Cyclohexane, which had been separated by decantation (or an equivalent amount), is used to extract unreacted hexahydrobenzoic acid from the hydrolyzed mixture. The latter is then neutralized, and caprolactam is extracted with methylene chloride, which gives a solution from which crude lactam of high strength is obtained by distillation of the solvent. The crude lactam may be advantageously purified by the process described in the copending application No. 218,808 filed August 21, 1962, now U.S. Patent No. 3,145,198. It should be noted that, in contrast to other solvents which could be taken into consideration, cyclohexane is inert toward oleum.

The temperature at which nitrosation of hexahydrobenzoic acid is carried out depends on the boiling point of cyclohexane in the presence of carbon dioxide, a gaseous reaction by-product, and is usually about 78–79° C. Nitrosation is preferably carried out with an oleum-nitrosylsulfuric acid nitrosating mixture, whose composition is defined by the following molar ratios: NO to total $SO_3$ is from 1:3 to 1:5, preferably from 1:3.5 to 1:4; and total $SO_3$ to free $SO_3$ is from 1:0.1 to 1:0.2, preferably from 1:0.5 to 1:0.18. Total $SO_3$ is calculated by adding to the amount of free $SO_3$ that corresponding to sulfuric acid and nitrosylsulfuric acid. The molar ratio of hexahydrobenzoic acid or its functional derivative to nitrosylsulfuric acid or, in general, to the nitrosation agent calculated as NO, is preferably kept between 1 and 2, and even more preferably around 1.5, i.e., an excess of hexahydrobenzoic acid is generally used.

The residence time in the reactor (or reactors) is from 20 minutes to one hour and 30 minutes, and preferably about 50–60 minutes.

The invention will be better understood from the description of an example of its practice, referring to the attached drawings in which FIG. 1 represents a scheme of the processing cycle, and FIG. 2 is a schematic sectional view of two reactors in series in which is performed the nitrosation of the cyclohexyl compound. The latter reaction may also be referred to as "lactamization."

Referring now to the drawings, lacatamization is carried out in two reactors arranged in series, as schematically shown in FIG. 2, at 10 and 10', and having an effective capacity of 36 liters.

Each reactor, 170 and 10', is equipped with an agitator, 12 and 12' respectively, which is driven by a motor, 13 and 13', respectively. The action of the agitators causes the liquid in the reactors to enter tubes 14 and 14', and to come out through ports, indicated by numbers 15 and 15', respectively. A different type of agitation may be used, provided it is efficient in forming an intimate mixture or emulsion of the materials constituting the reaction mass. The solution of hexahydrobenzoic acid in cyclohexane is introduced into the first reactor 10 through a tube 16; and the nitrosylsulfuric acid-oleum nitrosation mixture is introduced through tube 17. Through tube 18, the reaction mass passes from reactor 10 to reactor 10'. An overflow tube 19, is also provided, so that this transfer can take place also at the top of the reactors. The reaction product is discharged through tube 20, located at a suitable height of the second reactor 10', and is then worked up. From each of the two reactors, cyclohexane vapor passes through tubes 21 and 21', respectively to the multi-tube condenser 22, and condensed cyclohexane returns to the first reaction vessel 10 through siphon 23. Non-condensables are discharged through vent 24.

To start the reaction, the reactors are charged with a mixture of 24.4 kg. of an acid mixture obtained from a previous lactamization and having the composition which the lactamization product presents after separation of cyclohexane, as will be described later. Also, 15 kg. of cyclohexane is charged. The mixture tends to separate into two layers, which are mixed as intimately as possible by means of the agitators. Heating of the reactors is started, and the temperature is brought to a point where cyolohexane starts to distill. Cyclohexane is condensed in reflux condenser 22 and returns to reactor 10, while the carbon dioxide formed in the reaction is discharged. At this stage, no product is withdrawn from the second reactor 10'.

After having started the reaction in the two reactors in this manner, continuous feeding of the reagents is begun. Flow rates for reagents and products are given in the scheme shown in FIG. 1. The numbers indicate kg./hr. The abbreviations have the following meaning:

AEB=hexahydrobenzoic acid
CL=caprolactam
ANS=nitrosylsulfuric acid
CES=cyclohexane
SP=by-products From a storage vessel for fresh hexahydrobenzoic acid, 5.5 kg./hr. of hexahydrobenzoic acid is introduced into a second mixer (FIG. 1). From another storage vessel, which contains the cyclohexane solution of hexahydrobenzoic acid to be recycled (stemming from the extractor for excess of hexahydrobenzoic acid, to be discussed later), 18.8 kg./hr. of solution in introduced into the second mixture. From the second mixer, an amount equivalent to the sum of these two quantities is continuously discharged through an overflow device and fed to reactor 10. The reactor is also charged through tube 17 (FIG. 2) with 18.850 kg./hr. of a nitrosation mixture separately prepared in a first mixer (FIG. 1) and having the following composition: $H_2SO_4$=9.050 kg/hr.; free $SO^3$=2.2000 kg./hr.; nitrosylsulfuric acid=5.560 kg./hr. Lactamization is carried out with vigorous and intimate mixing of the reaction mixture components.

The reaction mixture continuously passes from the first to the second reactor. The total residence time in the reactors is 50–60 minutes. The reaction takes place at about 78–79° C., a temperature which is determined by the boiling point of cyclohexane under those conditions. Cyclohexane vaporizes continuously, condenses in reflux condenser 22 and returns through tube 23 to the first reactor 10, while the noncondensable carbon dioxide is discharged from the condenser at a rate of 1.800 kg./hr. (small amounts of cyclohexane are entrained, which may be recovered by adsorption on active carbon). From the second reactor 10′, 24.4 kg./hr. of a lactam solution having the following composition is continuously discharged: caprolactam=4.6 kg./hr.; hexahydrobenzoic acid=3.8 kg./hr.; sulfuric acid=15.8 kg./hr.; by-products=0.2 kg./hr. The mixture is cooled to 25° C. in a cooler not shown in the scheme, and is then charged to a vessel which acts as a separator and in which, in view of the difference in density, cyclohexane immediately separates as a layer above the lactam solution.

15 kg./hr. of cyclohexane is discharged from the separator and collected in a storage vessel. The acid solution is hydrolyzed with 32.2 kg./hr. of water in a lead-clad vessel at a maximum temperature of 30–35° C. To remove the excess hexahydrobenzoic acid, the hydrolyzed product is introduced into an extractor consisting of an agitated vessel which is charged with 15 kg./hr. of previously separated cyclohexane (or an equivalent amount).

Cyclohexane extracts from the hydrolyzed mixture unreacted hexahydrobenzoic acid and returns it in the dissolved state to the solution storage vessel, from which it will be fed to mixer 2, as previously indicated.

It must be noted that the excess of hexahydrobenzoic acid is not soluble in the hydrolyzed sulfuric acid solution of the lactam and therefore could be separated from it by decantation. Hence, the function of cyclohexane is not so much one of real extraction according to a given coefficient for the partition of hexahydrobenzoic acid between two solvents, as it is to incorporate hexahydrobenzoic acid into a liquid phase of lower specific gravity to achieve easier and cleaner separation from the aqueous lactam solution.

It should be noted that whereas, in the described example, cyclohexane is separated immediately after lactamization and is again added to the lactam solution after hydrolysis, the extraction of hexahydrobenzoic acid may be effected without this intermediate separation of cyclohexane, which may remain in the reaction mass. In this case, too, the separation of cyclohexane after hydrolysis may be carried out by decantation from the acid lactam solution, and the excess of hexahydrobenzoic acid may be removed in the form of a cyclohexane solution.

It should also be noted that, when the process indicated in the example is used, at the stage following lactamization and preceding hydrolysis, cyclohexane does not extract the excess of hexahydrobenzoic acid from the reaction mixture, because, in the presence of concentrated sulfuric acid, hexahydrobenzoic acid forms a complex which is not extractable with cyclohexane.

The acid lactam solution, separated from cyclohexane and the excess of hexahydrobenzoic acid, is neutralized to a pH of 7–7.5 with 5.5 kg./hr. of gaseous ammonia in a neutralizer (FIG. 1) consisting of a vessel in which the mixture is cooled with a multitube heat exchanger or in some other suitable manner.

Thus 4.6 kg./hr. of caprolactam and 53.5 kg./hr. of 40% ammonium sulfate solution are obtained in addition to 0.2 kg./hr. of by-products. The solution is extracted with 42 kg./hr. of methylene chloride by a two-stage counter-current process in extractors consisting of two vessels equipped with agitators In this manner there is obtained an organic solution containing caprolactam, 41.6 kg./hr. of methylene chloride, and 0.05 kg./hr. of by-products, and an ammonium sulfate solution containing in addition to 21.3 kg./hr. of ammonium sulfate also 0.4 kg./hr. of methylene chloride and 0.15 kg./hr. of by-products.

Distillation of the organic solution gives 4.6 kg./hr. of brick-red, crude lactam having a lactam content of 99%. The yields of pure lactam based on hexahydrobenzoic acid and nitrosylsulfuric acid consumed are 94.5% and 91.5%, respectively.

The practice of the invention has been described by way of example. However, those skilled in the art can practice the invention with many modifications and adaptations particularly with different material proportions and flow rates, within the wider limits indicated, and by using equipment differently constructed and arranged.

We claim:

1. A process for producing caprolactam by nitrosation of a cyclohexyl compound having a tertiary carbon atom and selected from the group consisting of hexahydrobenzoic acid and the functional derivatives of said acid, in the presence of cyclohexane and of a nitrosation agent comprising nitrosylsulfuric acid and oleum and having a composition defined by a molar ratio of NO:total $SO_3$ from 1:3 to 1:5 and a molar ratio of total $SO_3$:free $SO_3$ from 1:0.1 to 1:0.2, wherein a reaction mixture including a solution of said cyclohexyl compound and the nitrosation agent is continuously fed into reactor means at room pressure, is vigorously agitated therein to cause an exothermic nitrosation reaction to be maintained therein, causing cyclohexane to distill under reflux into said reactor means whereby the reaction temperature is levelled to substantially the boiling point of cyclohexane, continuously withdrawing from said reactor means reaction products including caprolactam, sulfuric acid and unreacted cyclohexyl compound in cyclohexane, decanting said withdrawn reaction products to separate cyclohexane therefrom, subjecting the remaining products to extract caprolactam therefrom, adding the further remaining products including the unreacted cyclohexyl compound and fresh cyclohexyl compound to said nitrosation agent to obtain said solution, and continuously feeding said obtained solution into said reactor means to continuously maintain the said nitrosation reaction at strictly controlled temperature in the neighborhood of the boiling point of cyclohexane upon continuously maintaining the said distillation under reflux of cyclohexane in said reactor means.

2. The process of claim 1, wherein the said reaction mixture is continuously fed into a first reactor means, wherein a part of the lactamization step is carried out in said first reactor means, the uncompletely lactamized mixture is transferred into a second reactor means to further proceed with said lactamization step therein, the said reaction products are withdrawn from said second reactor means, cyclohexane is caused to vaporize upon distillation in both said first and second reactor means, and said vaporized cyclohexane is returned into said first reactor means upon condensation thereof.

3. The process of claim 1, wherein in the said reaction mixture the molar ratio of the said cyclohexyl compound, calculated as hexahydrobenzoic acid, and the nitrosation agent, calculated as NO, is from 1:1 to 1:2.

4. The process of claim 1, wherein the said reaction products are subjected to hydrolysis to facilitate separation of unreacted cyclohexyl compound therefrom.

5. The process of claim 4, wherein the said reaction products are processed for separating cyclohexane therefrom prior to hydrolization of said products.

6. In the process of claim 5, the use of said separated cyclohexane for extracting unreacted cyclohexyl compound from said products after the hydrolization thereof.

7. A process for producing caprolactam by nitrosation of a cyclohexyl compound having a tertiary carbon atom and selected from the group consisting of hexahydrobenzoic acid and the functional derivatives of said acid, in the presence of cyclohexane and of nitrosyl-sulfuric acid as a nitrosation agent, wherein a reaction mixture, including a solution of said cyclohexyl compound in cyclohexane and said nitrosation agent, is continuously fed into reactor means at room pressure, kept therein to cause an exothermic nitrosation reaction to be maintained therein, the cyclohexane is caused to distill under reflux into said reactor means whereby the reaction temperature is levelled to substantially the boiling point of cyclohexane, reaction products including caprolactam, and sulfuric acid and unreacted cyclohexyl compound in cyclohexane are continuously withdrawn from said reactor means, said withdrawn reaction products are decanted for separating cyclohexane therefrom, the remaining products are subjected to processing for extracting caprolactam therefrom, the further remaining products, including unreacted cyclohexyl compound and fresh cyclohexyl compound, are added to cyclohexane, and the mixture so obtained is continuously fed into said reactor means to continuously maintain the said nitrosation reaction at a strictly controlled temperature at approximately the boiling point of cyclohexane, while continuously maintaining the said distillation under reflux of cyclohexane in said reactor means.

8. The process of claim 7, wherein the said reaction mixture is continuously fed into a first reactor means, wherein a part of the lactamization step is carried out in said first reactor means, the incompletely lactamized mixture is transferred into a second reactor means to further proceed with lactamization therein, the said reaction products are withdrawn from said second reactor means, cyclohexane is caused to vaporize upon distillation in both said first and second reactor means, and said vaporized cyclohexane is returned into said first reactor means upon condensation thereof.

9. The process of claim 7, wherein in the said reaction mixture the molar ratio of the said cyclohexyl compound, calculated as hexahydrobenzoic acid, and the nitrosation agent, claculated as NO, is between 1:1 to 1:2.

10. The process of claim 7, wherein the said reaction products are subject to hydrolysis to facilitate separation of unreacted hexahydrobenzoic acid therefrom.

11. The process of claim 10, wherein the said reaction products are processed for separating cyclohexane therefrom prior to hydrolization of said products.

12. In the process of claim 11, the use of said separated cyclohexane for extracting unreacted cyclohexyl compound from said products after the hydrolization thereof.

13. A process for producing caprolactam upon nitrosation of a cyclohexyl compound having a tertiary carbon atom and selected from the group consisting of hexahydrobenzoic acid and the functional derivatives of said acid, in the presence of cyclohexane and of a nitrosation agent comprising nitrosyl sulfuric acid, wherein a reaction mixture including a solution of said cyclohexyl compound in cyclohexane and a nitrosation agent having a composition defined by a molar ratio of $NO$:total $SO_3$ from 1:3 to 1:5 and a molar ratio of total $SO_3$:free $SO_3$ from 1:0.1 to 1:0.2, is continuously fed into reactor means at room pressure, kept therein to cause an exothermic nitrosation reaction to be maintained in said reactor means, the cyclohexane is caused to distill under reflux into said reactor means whereby the reaction temperature is levelled to substantially the boiling point of cyclohexane, reaction products, including caprolactam, and sulfuric acid and unreacted cyclohexyl compound in cyclohexane, are continuously withdrawn from said reactor means, said withdrawn reaction products are processed for separating cyclohexane and for extracting caprolactam therefrom, and cyclohexane is continuously fed into said reactor means to continuously maintain the said nitrosation reaction at strictly controlled temperature at approximately the boiling point of cyclohexane, while continuously maintaining the said distillation under reflux of cyclohexane in said reactor means.

14. The process of claim 13, wherein the said reaction mixture is continuously fed into a first reactor means, a part of the lactamization step is carried out in said first reactor means, the uncompletely lactamized mixture is transferred into a second reactor means to further proceed with said step therein, the said reaction products are withdrawn from said second reactor means, cyclohexane is caused to vaporize by distillation in both said first and second reactor means, and said vaporized cyclohexane is returned into said first reactor means upon condensation thereof.

15. The process of claim 13 wherein in the said reaction mixture the molar ratio of the said cyclohexyl compound, calculated as hexahydrobenzoic acid, and the nitrosation agent, calculated as NO, is from 1:1 to 1:2.

16. A process for producing caprolactam upon nitrosation of a cyclohexyl compound having a tertiary carbon atom in the presence of cyclohexane and of a nitrosation agent, wherein a reaction mixture including a solution of said cyclohexyl compound in cyclohexane and said nitrosation agent is continuously fed into reactor means to cause an exothermic nitrosation reaction to be maintained in said reactor means, the cyclohexane is caused to distill under reflux into said reactor means whereby the reaction temperature is levelled to substantially the boiling point of cyclohexane, reaction products, including caprolactam, and unreacted cyclohexyl compound in cyclohexane, are continuously withdrawn from said reactor means, said withdrawn reaction products are processed for extracting caprolactam therefrom, and cyclohexane is continuously fed into said reactor means to continuously maintain the said nitrosation reaction at a strictly controlled temperature at approximately the boiling point of cyclohexane by continuously maintaining the said distillation under reflux of cyclohexane in said reactor means.

17. The process of claim 16, wherein the said reaction mixture is continuously fed into a first reactor means, a part of the lacatamization step is carried out in said first reactor means, the incompletely lactamized mixture is transferred into a second reactor means to further proceed with said step, the said reaction products are withdrawn from said second reactor means, cyclohexane is caused to vaporize by distillation in both said first and second reactor means, and said vaporized cyclohexane is returned into said first reactor means upon condensation thereof.

18. The process of claim 16, wherein in the said reaction mixture the molar ratio of the said cyclohexyl compound, calculated as hexahydrobenzoic acid, and the nitrosation agent, calculated as NO, is from 1:1 to 1:2.

References Cited by the Examiner

UNITED STATES PATENTS

| | | | |
|---|---|---|---|
| 2,249,177 | 7/41 | Schlack | 260—239.3 |
| 2,351,381 | 6/44 | Wiest | 260—239.3 |
| 2,573,374 | 10/51 | Wichterle | 260—239.3 |
| 2,692,878 | 10/54 | Kahr | 260—239.3 |
| 2,797,216 | 6/57 | Wagner et al. | 260—239.3 |
| 2,839,369 | 6/58 | Mullins | 23—263 |
| 2,863,737 | 12/58 | Green | 23—263 |
| 3,022,291 | 2/62 | Muench et al. | 260—239.3 |
| 3,062,812 | 11/62 | Taylor | 260—239.3 |
| 3,090,739 | 5/63 | Ito | 260—239.3 |
| 3,114,748 | 12/63 | Bigot et al. | 260—239.3 |
| 3,119,814 | 1/64 | Bigot et al. | 260—239.3 |

WALTER A. MODANCE, *Primary Examiner.*

IRVING MARCUS, JOHN D. RANDOLPH, *Examiners.*